(12) United States Patent
Card, II

(10) Patent No.: US 8,494,343 B2
(45) Date of Patent: Jul. 23, 2013

(54) METHODS AND APPARATUS FOR PRESENTING TEXT DATA DURING TRICK PLAY MODE OF VIDEO CONTENT

(75) Inventor: John Anthony Card, II, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1060 days.

(21) Appl. No.: 12/189,334

(22) Filed: Aug. 11, 2008

(65) Prior Publication Data

US 2009/0167940 A1 Jul. 2, 2009

Related U.S. Application Data

(60) Provisional application No. 61/017,856, filed on Dec. 31, 2007.

(51) Int. Cl.
*H04N 9/80* (2006.01)
(52) U.S. Cl.
USPC .......................................... 386/239; 348/468
(58) Field of Classification Search
USPC ................................ 386/68, 95, 239; 348/468
See application file for complete search history.

(56) References Cited

U.S. PATENT DOCUMENTS

| 5,566,174 A | 10/1996 | Sato et al. |
| 5,848,217 A * | 12/1998 | Tsukagoshi et al. ........... 386/239 |
| 6,871,006 B1 | 3/2005 | Oguz et al. |
| 7,330,640 B2 | 2/2008 | Schultz et al. |
| 2003/0194213 A1* | 10/2003 | Schultz et al. ................... 386/95 |
| 2007/0030386 A1* | 2/2007 | Cha et al. ......................... 348/468 |
| 2007/0171303 A1* | 7/2007 | Barbieri et al. ................ 348/468 |
| 2008/0279535 A1* | 11/2008 | Haque et al. .................... 386/95 |

FOREIGN PATENT DOCUMENTS

WO    WO02102079 A1 * 12/2002

OTHER PUBLICATIONS

Toub, S.(Sep. 2005). DVR-MS: Adventures in Closed Captioning. Retrieved from http://blogs.msdn.com/b/toub/archive/2005/09/17/470491.aspx.*

* cited by examiner

*Primary Examiner* — Ashok Patel
*Assistant Examiner* — Brain Shaw
(74) *Attorney, Agent, or Firm* — Ingrassia Fisher & Lorenz, P.C.

(57) ABSTRACT

Various embodiments of apparatus and/or methods are described for presenting text data (e.g., closed captioning data) during trick play mode presentation of a video stream. An analyzed file of the text data is provided on a digital video recorder (DVR), and during trick play mode, text data corresponding to video frames of a video stream is retrieved from the analyzed file and outputted for presentation by the presentation device.

11 Claims, 6 Drawing Sheets

METHODS AND APPARATUS FOR PRESENTING TEXT DATA DURING TRICK PLAY MODE OF VIDEO CONTENT

RELATED APPLICATIONS

This application claims the benefit of U.S. Provisional Application No. 61/017,856, entitled "METHODS AND APPARATUS FOR PRESENTING TEXT DATA DURING TRICK PLAY MODE OF VIDEO CONTENT", filed on Dec. 31, 2007, which is hereby incorporated by reference in its entirety.

BACKGROUND

Digital video recorders (DVRs) and personal video recorders (PVRs) allow viewers to record video in a digital format to a disk drive or other type of storage medium for later playback. DVRs are often incorporated into set-top boxes for satellite and cable television services. A television program stored on a set-top box allows a viewer to perform time shifting functions, and may additionally allow a viewer to skip over portions of the recording that the viewer does not desire to watch. This is known as trick play mode viewing. Unfortunately, during trick play mode presentation of a video stream, the closed captioning data for the video stream is not displayed on screen. This is because closed captioning data is processed and presented by a closed captioning decoder in real time during the presentation of the video stream. If closed captioning data were displayed on screen during trick play mode viewing, then viewers could locate relevant parts of a recorded video stream more easily, enabling more efficient viewing of the recording. However, present DVRs are inadequate for providing this functionality to viewers.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the reception, processing, and outputting of audio/video (A/V) content. More particularly, the apparatus, systems and methods described herein facilitate the presentation of text data (e.g., closed captioning data) in association with the display of A/V content at non-real time presentation rates (e.g., fast forwarding). In short, various embodiments described herein provide apparatus, system and/or methods for presenting text data during trick play mode presentation of A/V content.

In at least one embodiment, the A/V content to be received, processed, outputted and/or communicated may come in any form of a video stream. It is to be appreciated that the video stream may be supplied by any source, such as an over-the-air broadcast, a satellite or cable television distribution system, a digital video disk (DVD) or other optical disk, the internet or other communication networks and the like. In at least one embodiment, the video stream includes text data, such as closed captioning data or subtitles, that is included in the video stream or associated with the video stream. Thus, in at least one embodiment, the video stream may comprise video data, audio data and text data.

Figure 1:
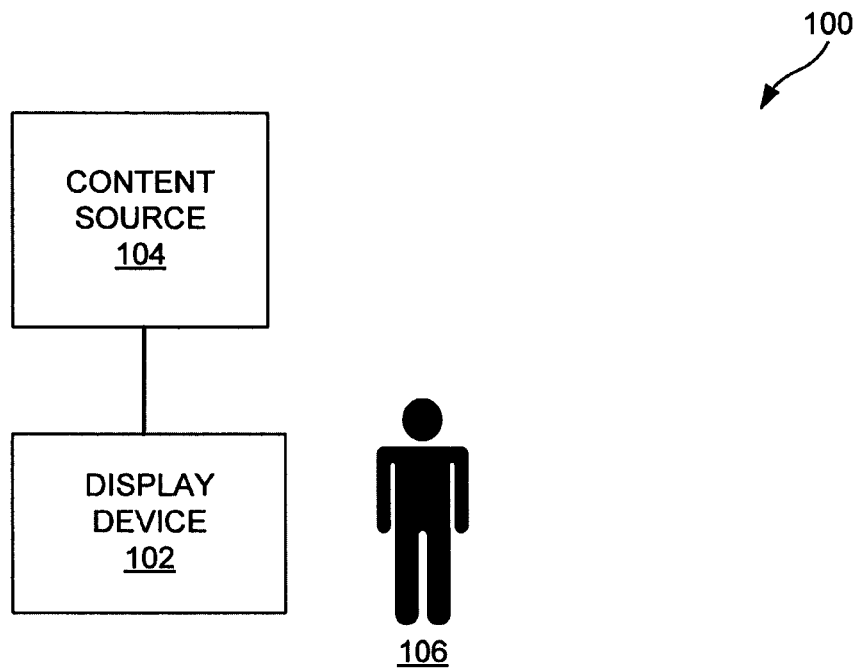
FIG. 1 illustrates an embodiment of an entertainment system.

In various embodiments described herein, the text data corresponding with an A/V stream is processed and sorted in a presentation order to generate an analyzed file of text data. An A/V stream will also be referred to herein as a video stream. However, it is to be appreciated that a video stream may include an associated audio component. The analyzed file of text data may be generated by lexically analyzing the text data of the video stream or may be received from an external source, such as a content provider. The analyzed file may include all of the text data for the video stream, all of the displayable characters of text data, or a selected subset of the text data. In at least one embodiment, the analyzed file of the text data is optimized for a selected non-real time presentation rate of the video stream (e.g., includes a subset of the closed captioning data that summarizes the audio portions of the video stream). The text data from the analyzed file may then be presented in association with the video stream at the non-real time presentation rate of the video stream. 100141 FIG. 1 illustrates an embodiment of an entertainment system 100. The entertainment system 100 presents content to a user 106. In at least one embodiment, the content presented to the user 106 includes a video stream, such as a television program, movie or other recorded content and the like. The entertainment system 100 includes a display device 102 and a content source 104. Each of these components is discussed in greater detail below.

The display device 102 is configured to receive content from one or more content source(s) 104, and to present the received content to the user 106. The received content may include associated text data, such as closed captioning data or subtitles. While the specification will refer to text data as closed captioning data, it is to be appreciated that the teachings described herein may apply to processing and outputting any type of text data associated with a video stream. The display device 102 may receive a video stream in any format (e.g., analog or digital format), and present the video stream to the user 106. In at least one embodiment, the display device 102, at the option of the user 106, presents the closed captioning data simultaneously with the video data. For example, the user 106 may activate a closed captioning option of the display device 102.

Typically, a video stream is presented by a display device 102 at a real time presentation rate. In other words, the video stream is presented at a presentation rate of I x, which is the same presentation rate that the video stream was originally intended for presentation. The real time presentation rate will also be referred to herein as the standard presentation rate of the video stream.

The content source 104 may comprise any system or apparatus configured to provide presentation data, such as a video stream, to the display device 102. The content source 104 may be external or internal to the display device 102. The display device 102 and the content source 104 may be communicatively coupled through any type of wired or wireless connection, communication network and the like. Exemplary content sources include television distribution systems (e.g., over-the-air distribution systems, cable television distribution systems, satellite television distribution systems and broadband distribution systems), set-top boxes connected to a television distribution network, DVD players and other optical disk players, digital storage mediums (e.g., DVRs) and the internet. The video stream provided by the content source 104 may include closed captioning data. The closed captioning data may be embedded in the video stream (e.g., in vertical blanking interval line 21 or user data) or may be provided in a separate data stream. In at least one embodiment, the content source 104 may further provide an analyzed file of closed captioning data to the display device 102 that is used for presentation of the closed captioning data during trick play mode.

In at least one embodiment, the analyzed file of closed captioning data includes all of the displayable characters of the closed captioning data associated with the video stream sorted in their presentation order. The analyzed file of closed captioning data may be generated by lexically analyzing and sorting the closed captioning data into the presentation order. The characters may be assembled as whole words and/or phrases delineated by white space. Typically, closed captioning data is embedded within video frames in a specified portion of the video frame data. Each video frame includes two bytes of closed captioning data, which include either displayable characters, a command code (e.g., placement information regarding other characters), or a null-operation that is placed in the video stream to align the audio components of the video stream with the closed captioning data. The video frames don't always arrive in the presentation order of the video stream, and thus, the closed captioning data may not arrive in the presentation order. By generating an analyzed file of closed captioning data, the closed captioning data from the analyzed file may be displayed on screen independently of the video frames associated with the closed captioning data. In other words, closed captioning data may be presented on screen at an offset time from the video frame of which the closed captioning data was originally embedded.

The display device 102 may generate an analyzed file of text data by lexically analyzing the closed captioning data and/or receiving the analyzed file from an external source, such as the content source 104. In at least one embodiment, the display device 102 receives user input requesting a trick play mode presentation of the video stream. For example, the user 106 may request fast forwarding of the video stream at a 2× presentation rate. Responsive to the request, the display device 102 presents the video stream at a non-real time presentation rate. In other words, the display device 102 presents the video stream at a presentation rate that is greater than or less than the standard presentation rate. When presenting video content at rates greater than the standard presentation rate, the display device 102 may show a subset of the frames of the video content. For example, if the non-real time presentation rate is 2×, then the display device 102 may present every other frame of the video stream or may select some subset containing half of the original frames of the video stream.

The display device 102 further retrieves closed captioning data associated with the video stream from the analyzed file, and presents the retrieved closed captioning data with the video content. In at least one embodiment, the closed captioning data presented may comprise a subset of the closed captioning data that is associated with the video stream. In other words, the display device 102 may not show all of the words and/or phrases of the closed captioning data when fast forwarding through the video stream. Instead, the display device 102 may display words and/or characters which summarize the audio portions of the video stream. This allows the display device 102 to maintain a correlation between the closed captioning data and the video frames actually presented when the presentation rate of the video stream becomes too fast for presentation of all of the closed captioning data associated with the presented video frames.

Through the operation of the entertainment system 100, the user 106 is presented with closed captioning data during non-real time presentation of video content. In some embodiments, the display device 102 may present the closed captioning data on screen in place of the video content during fast forwarding. In either embodiment, the user 106 may more efficiently determine portions of the video stream of interest to the user 106 by reading the closed captioning data displayed during the trick play mode presentation of the video stream. Entertainment system 100 may include other elements or components not illustrated for the sake of brevity.

Figure 2:
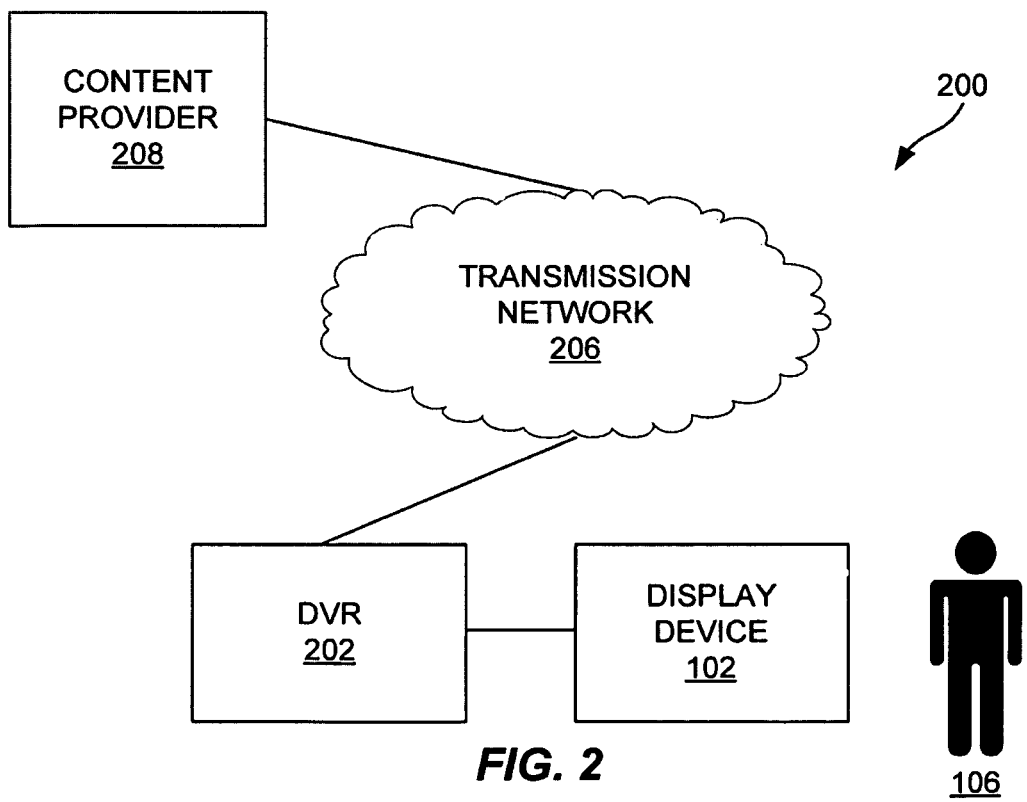
FIG. 2 illustrates an embodiment of a content distribution system.

FIG. 2 illustrates an embodiment of a content distribution system 200. The content distribution system 200 is configured to present closed captioning data to a user 106 during trick play mode of a video stream. The content distribution system 200 includes a DVR 202, a display device 102, a transmission network 206 and a content provider 208. Each of these components is discussed in greater detail below.

The display device 102 may comprise any type of device operable for receiving and displaying analog and/or digital video signals. In at least one embodiment, the display device 102 may be a television set or video display that contains an integrated television converter device (e.g., an internal cable-ready television tuner housed inside a television), or, alternatively, that is connected to an external television converter device for receiving and demodulating analog and/or digital signals for presentation on the display device 102 (e.g., a set-top box).

Using an integrated television converter device, the display device 102 may be operable to communicate directly with the transmission network 206. For example, the transmission network 206 may comprise an over-the-air distribution system (e.g., free television), and the display device 102 may receive television broadcast signals using an internal or external antenna. The transmission network 206 may also comprise a cable television distribution system, and the display device 102 may comprise a cable ready television adapted to receive and demodulate analog or digital cable television signals for presentation to the user 106. A direct broadcast satellite or other type of wired or wireless communication network may also be used solely or in conjunction with the foregoing. In at least one embodiment, the display device 102 may communicate with the transmission network 206 through an intermediate device, such as a set-top box.

The DVR 202 is communicatively coupled to the display device 102 through any type of wired or wireless connection. Exemplary wired connections include coax, fiber, composite video and high-definition multimedia interface (HDMI). Exemplary wireless connections include WiFi and Bluetooth. In at least one embodiment, the DVR 202 may be embodied in a television converter device (e.g., a satellite television receiver). The DVR 202 may also be incorporated into the display device 102.

The DVR 202 captures and records video content from attached devices onto a storage medium for subsequent presentation to the user 106. As illustrated in FIG. 2, the DVR 202 is coupled to a content provider 208 (e.g., a satellite television provider) through the transmission network 206. Thus, the DVR 202 receives a television signal (e.g., a broadcast) or other data signal (e.g., digital video data or other data formatted into a video stream) from the transmission network 206, and records television programs and other content provided by the content provider 208. The DVR 202 may perform processing functions to lexically analyze closed captioning data associated with or embedded in the video stream in order to generate an analyzed file utilized to present closed captioning data to the user 106 during trick play mode of a recorded video stream. In at least one embodiment, the DVR 202 receives the analyzed file of closed captioning data from the content provider 208 through the transmission network 206. For example, the DVR 202 may request the analyzed file of closed captioning data for a selected trick play mode rate responsive to recording the video stream or responsive to the user 106 selecting to view the recorded video stream. It is to be appreciated that the DVR 202 may capture and record video streams from other non-broadcast services, such as video recorders, DVD players, personal computers or the internet.

The DVR 202 may include a remote control or other input device (not shown) that the user 106 may utilize for remotely operating the DVR 202 and/or the display device 102. More specifically, a remote control may be operable for controlling the presentation of video and/or other data presented by the DVR 202 on the display device 102. For example, the remote control may allow the user 106 to fast forward, pause or rewind presentation of a recorded video stream. The remote control may further allow a user to activate the display of closed captioning data during presentation of a recorded video stream. In at least one embodiment, the remote control and the DVR 202 allow a user to automatically activate the display of closed captioning data anytime a fast forwarding or rewinding function of the DVR 202 is utilized.

The content provider 208 comprises any source or sources of television or other video signals. In at least one embodiment, the content provider 208 provides a television broadcast signal to the DVR 202 over the transmission network 206. The content provider 208 may provide closed captioning data with the television broadcast signal. The content provider 208 may be a television station that generates and provides the content or may be a television service that provides retransmission of television signals (e.g., a satellite television provider). It is to be appreciated that the content provider 208 may also provide some retransmission services while generating and providing some original or derivative content.

The content provider 208 may further provide analyzed files of closed captioning data (in addition to the closed captioning data embedded in the video stream) to the DVR 202. In at least one embodiment, the content provider 208 may provide an analyzed file of closed captioning data for selected trick play mode presentation rates. The analyzed file of closed captioning data may include a subset of the closed captioning data embedded in the video stream. For example, the content provider 208 may provide an analyzed file of closed captioning data for a 10× presentation rate, and the analyzed file of closed captioning data may include only selected words that summarize the original closed captioning data to allow a user to determine the subject matter of selected portions of the video stream.

The transmission network 206 may comprise any type of communication network utilized between the DVR 202 and the content provider 208. Exemplary communication networks include television distribution networks (e.g., over-the-air, satellite and cable television networks), wireless communication networks, public switched telephone networks (PSTN), and local area networks (LAN) or wide area networks (WAN) providing data communication services. The transmission network 206 may utilize any desired combination of wired (e.g., cable and fiber) and/or wireless (e.g., cellular, satellite, microwave, and radio frequency) communication mediums and any desired network topology (or topologies when multiple mediums are utilized). The DVR 202 may communicate with the transmission network 206 through a wired or wireless connection. The transmission network 206 may distribute television broadcast and other data signals in digital or analog form. Exemplary video formats include moving picture expert group (MPEG), flash, Windows Media, and the like. Content distribution system 200 may include other elements or components not illustrated for the sake of brevity.

Figure 3:
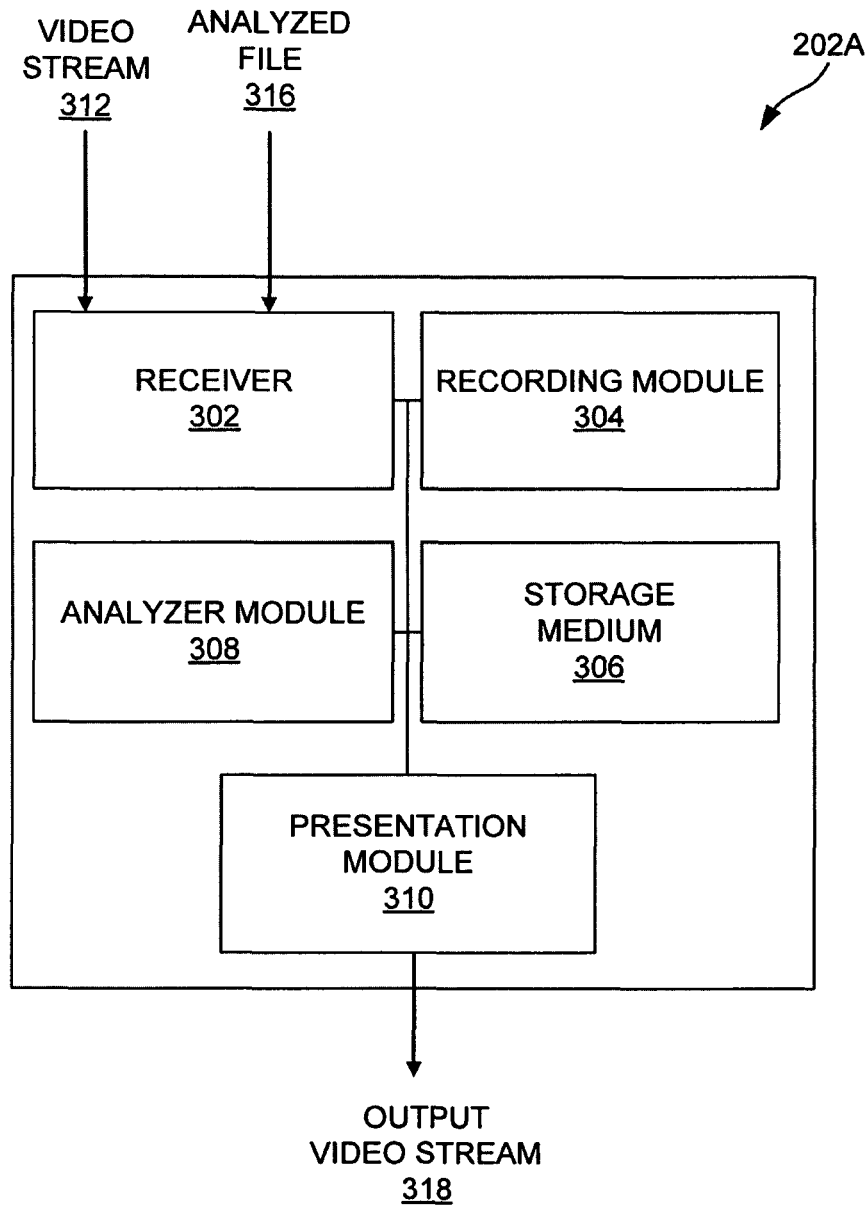
FIG. 3 illustrates an embodiment of functional components of the DVR of FIG. 2.

FIG. 3 illustrates an embodiment of functional components of a DVR 202A of FIG. 2. FIG. 3 will be discussed in reference to the content distribution system 200 illustrated in FIG. 2. The DVR 202A comprises a receiver 302, a recording module 304, a storage medium 306, an analyzer module 308 and a presentation module 310. Each of these components is discussed in greater detail below.

The receiver 302 receives a video stream 312 (with embedded closed captioning data) from the transmission network 206 (see FIG. 2). The receiver 302 may comprise a wired or wireless receiver. The receiver 302 may further receive other data from the transmission network 206, such as an analyzed file 316 of closed captioning data for presentation during trick play mode of the video stream 312. In at least one embodiment, the analyzed file 316 is received from the content provider 208 (see FIG. 2) in association with the video stream. The DVR 202A may also query a content provider 208 for the analyzed file, for example, responsive to a request from the user 106 (see FIG. 2) to view the video stream. In some embodiments, the DVR 202A may also generate the analyzed file 316 by analyzing the closed captioning data embedded in the video stream 312.

The recording module 304 receives the video stream 312 and stores the video stream 312 on the storage medium 306. The storage medium 306 may be any type of temporary or persistent storage device capable of storing the video stream 312. The storage medium 306 may be internal and/or external to the DVR 202A and may include one or more storage devices. For example, the storage medium 306 may be an internal hard drive or flash memory. The video stream 312 and the analyzed file 316 may be stored together and/or separately on the storage medium 306.

If an analyzed file 316 is not received from a content provider 208 (see FIG. 2), then the DVR 202A may generate the analyzed file. The analyzer module 308 is configured to sort and lexically analyze the closed captioning data embedded in the video stream 312 according to a presentation order to generate an analyzed file 316 of closed captioning data. In at least one embodiment, the analyzer module 308 sorts and analyzes the closed captioning data of the video stream 312 during the recording process. In some embodiments, the analyzer module 308 may sort and analyze the closed captioning data of the video stream 312 subsequent to recording. For example, the analyzer module 308 may sort and analyze the closed captioning data of the video stream 312 upon receiving a playback instruction from the user 106 (see FIG. 2). In at least one embodiment, the analyzer module 308 may be configured to generate an analyzed file 316 for a selected trick play mode that contains a subset of the closed captioning data of the video stream 31-2. The analyzer module 308 may analyze the closed captioning data of the video stream 312 to determine which characters and/or words summarize the content of the video stream 312.

The presentation module 310 is configured to output an output video stream 318 to the user 106 (see FIG. 2). The presentation module 310 retrieves the video stream 312 from the storage medium 306, and presents the content of the video stream 312 to the user 106 (see FIG. 2). In at least one embodiment, the presentation module 310 receives information requesting trick play mode presentation of the recorded video stream 312. Responsive to the request, the presentation module 310 outputs the video stream 318 for presentation at a presentation rate different than the real time presentation rate of the video stream 312. The presentation module 310 further retrieves closed captioning data from the analyzed file 316 and outputs the closed captioning data for presentation in association with the output video stream 318.

Those of ordinary skill in the art will appreciate that the various functional elements 302 through 310 shown as operable within the DVR 202A may be combined into fewer discrete elements or may be broken up into a larger number of discrete functional elements as a matter of design choice. For example, the analyzer module 308, the recording module 304 and/or the presentation module 310 may be combined into a single processing module. Thus, the particular functional decomposition suggested by FIG. 3 is intended merely as exemplary of one possible functional decomposition of elements within the DVR 202A.

Figure 4:
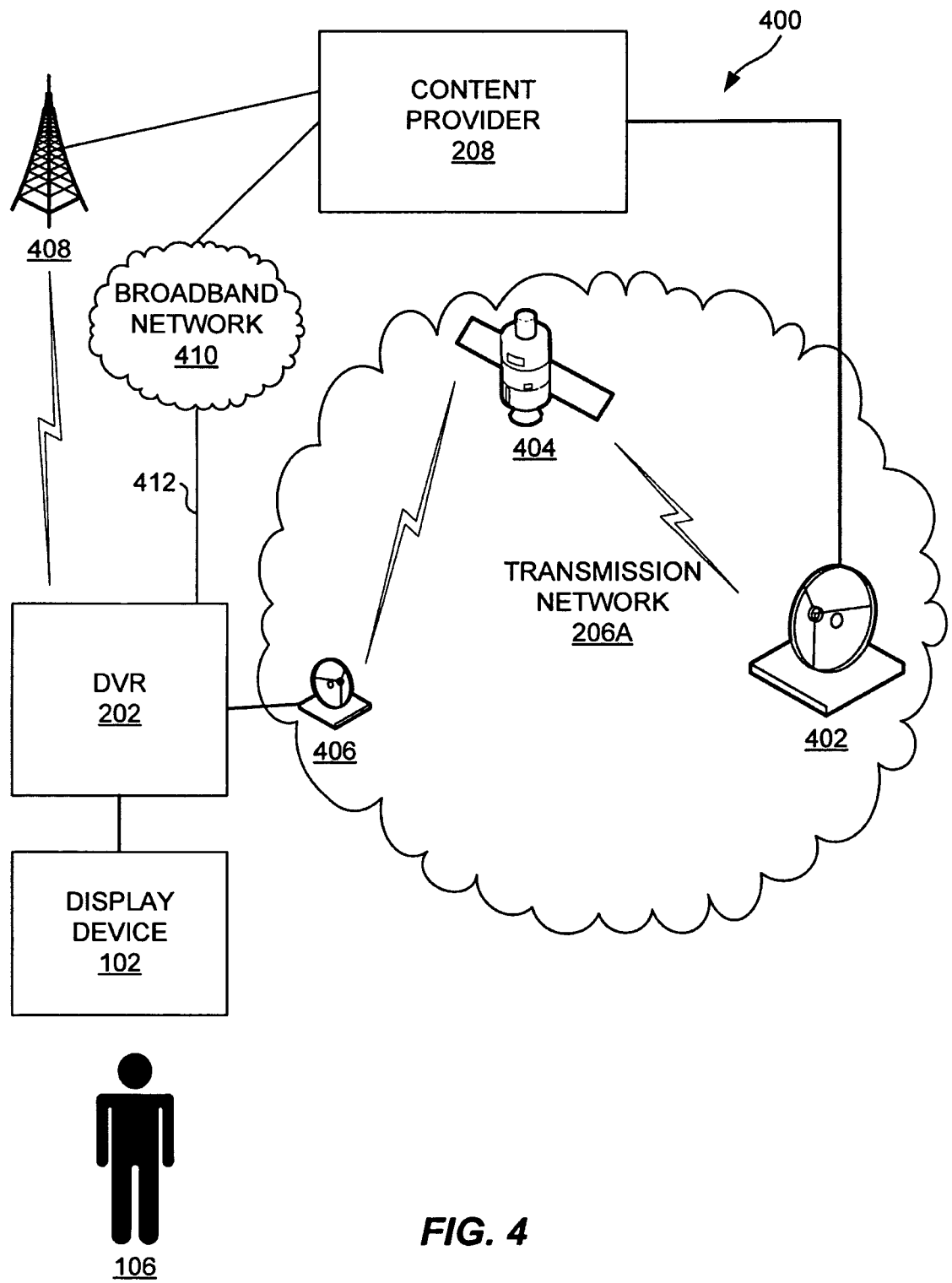
FIG. 4 illustrates an embodiment of a satellite broadcast system.

FIG. 4 illustrates an embodiment of a satellite broadcast system 400. More particularly, FIG. 4 illustrates details of a transmission network 206A. Satellite broadcast system 400 will be discussed in reference to the content distribution system 200 illustrated FIGS. 2-3.

Satellite broadcast system. 400 includes a content provider 208 in signal communication with an uplink system 402 of a transmission network 206A. The content provider 208 provides the uplink system 402 with television programs that are transmitted to a DVR 202. Television programs may be broadcast by the transmission network 206A to the DVR 202. The television program may be embodied as MPEG-2, MPEG-4 or other digital video signals, analog or baseband signals, and/or other video data on a channel of the satellite broadcast system 400.

Satellite broadcast system 400 further comprises a satellite 404 in signal communication with the uplink system 402. The satellite 404 broadcasts television programs received from the uplink system 402. The satellite broadcast system 400 further comprises a satellite antenna 406 for receiving the television program broadcast from the satellite 404. The satellite antenna 406 is in signal communication with the DVR 202, and provides the DVR 202 with the television program. The broadcast television program content is received and stored on the DVR 202, and may be presented on the display device 102 responsive to the user 106 selecting to view the recorded television program. The transmission network 206A may also be configured to transmit an analyzed file of closed captioning data and/or other data to the DVR 202. The closed captioning data may be utilized by the DVR 202 to process the television programming and present closed captioning data during trick play mode presentation of video streams.

In at least one embodiment, the DVR. 202 may be configured to receive over-the-air television programming from a transmitter 408 using a built-in receiver/tuner. For example, the DVR 202 may receive local programming over-the-air, and may receive national programming from the transmission network 206A. In at least one embodiment, the DVR 202 may receive the analyzed file of closed captioning data from the transmitter 408. In some embodiments, the DVR 202 may receive the analyzed file of closed captioning data for the over-the-air programming from the content provider 208 through the transmission network 206A.

As illustrated in FIG. 4, the DVR 202 may optionally be communicatively coupled to the content provider 208 through a broadband network 410 using a broadband connection 412. The broadband connection 412 may be utilized to deliver an analyzed file of closed captioning data and/or video programming to the DVR 202. It is to be appreciated that any combination of the described communication paths may be utilized to transmit video programming and/or closed captioning data between the content provider 208 and the DVR 202. For example, the DVR 202 may receive video programming through the transmission network 206A, and may request closed captioning data associated with the video programming from the content provider 208 using the broadband network 410. It is also to be appreciated that the closed captioning data and the video programming may be provided by different sources (e.g., two different content providers 208).

Figure 5:
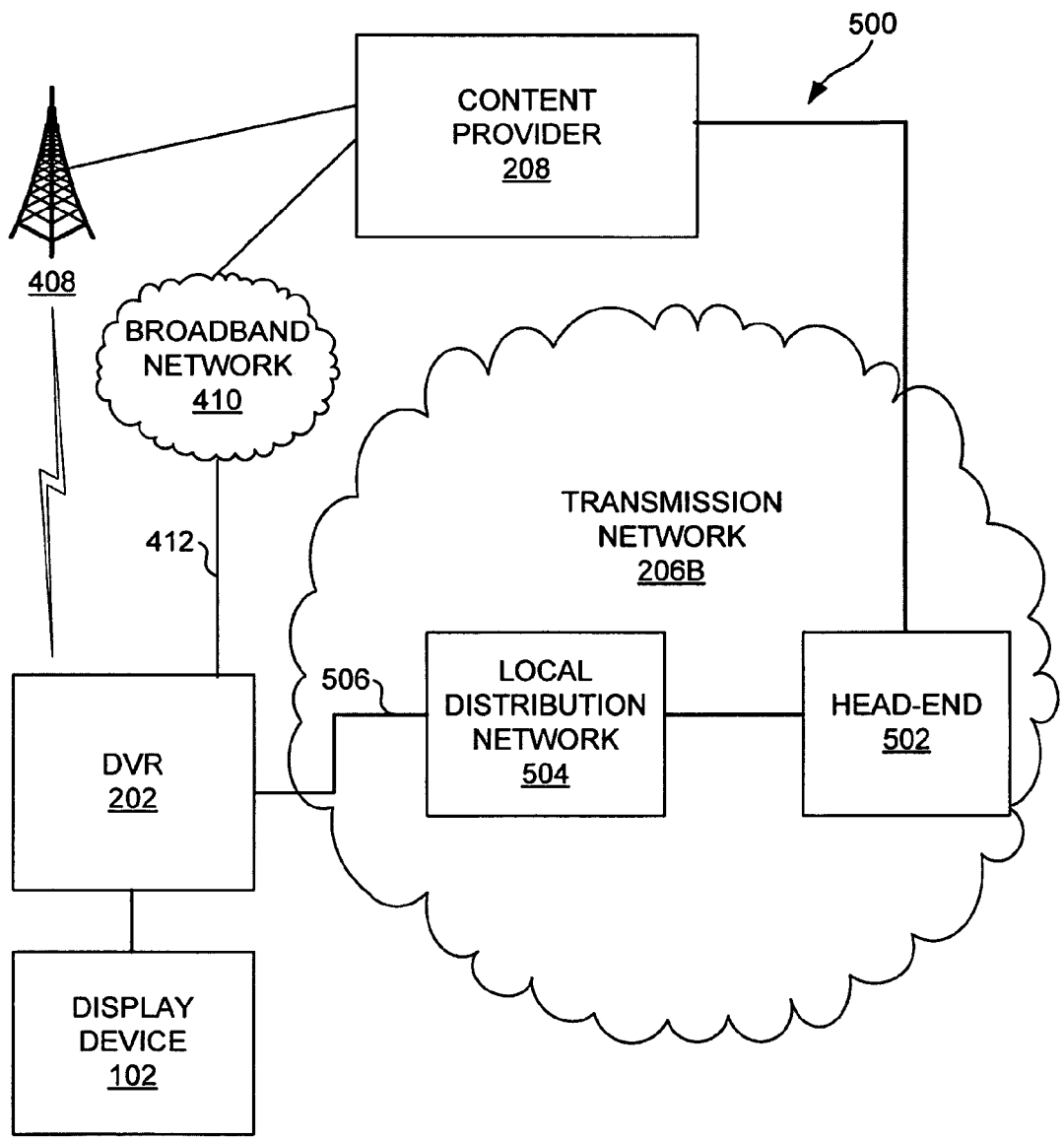
FIG. 5 illustrates an embodiment of a cable television distribution system.
Figure 5:
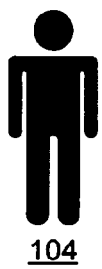

Transmission network 206 (see FIG. 2) may also be embodied in a cable television distribution system. FIG. 5 illustrates an embodiment of a cable television distribution system 500. More particularly, FIG. 5 illustrates details of a transmission network 206B. Cable television distribution system 500 will be discussed in reference to the content distribution system 200 illustrated in FIGS. 2-3.

Cable television distribution system 500 comprises a head-end 502 in signal communication with a content provider 208. The content provider 208 provides the head-end 502 with television programs that are transmitted to the display device 102. Television programs may be broadcast by transmission network 206B, or may be pushed to the DVR 202 responsive to a request by the user 106. Television programs may also be pushed to the DVR 202 using a broadband connection 412 through the broadband network 410.

Cable television distribution system 500 further comprises a local distribution network 504 in signal communication with the head-end 502. The local distribution network 504 is operable for receiving content from the head-end 502 and distributing the content to individual display devices 102. The DVR 202 is in signal communication with the local distribution network 504 using a drop 506 from a feeder line of the local distribution network 504. The local distribution network 504 may provide content as a broadcast to the DVR 202, or may provide content to a specific addressable DVR 202 using the broadband connection 412. In at least one embodiment, the broadband network 410 may be integrated within the transmission network 206B.

Figure 6:
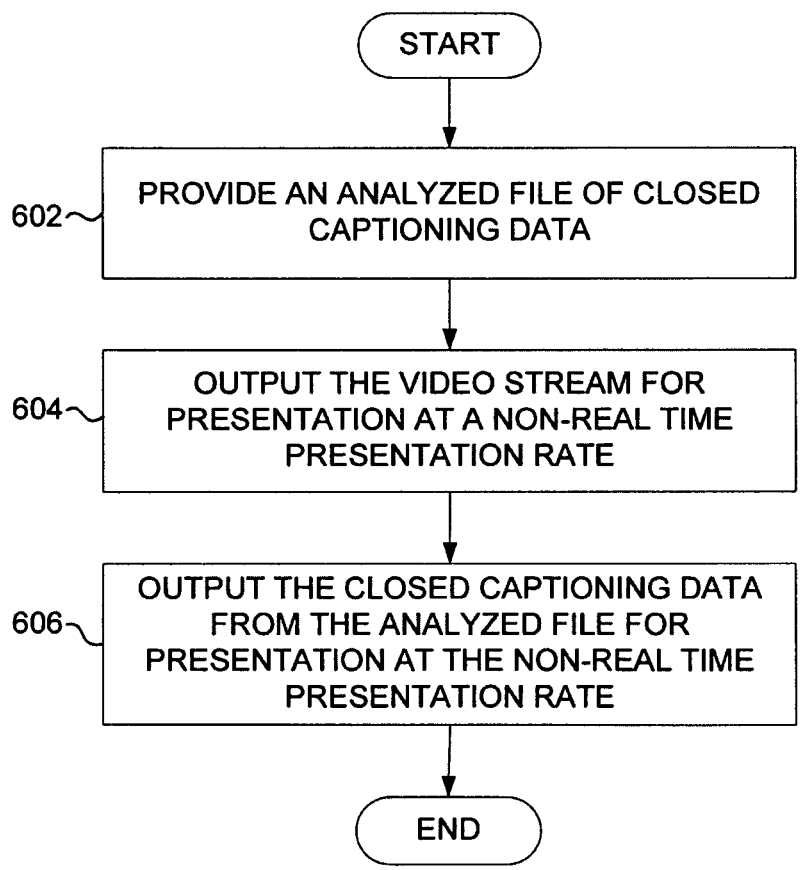
FIG. 6 illustrates an embodiment of a process for presenting text data during trick play mode of a video stream.

FIG. 6 illustrates an embodiment of a process for presenting text data during trick play mode of a video stream. The operation of FIG. 6 is discussed in reference to presenting closed captioning data during trick play mode of a video stream. However, it is to be appreciated that the operation of the process of FIG. 6 may be applied to present other types of text data, such as subtitles, during trick play mode presentation of a video stream. The operations of the process of FIG. 6 are not all-inclusive, and may comprise other operations not illustrated for the sake of brevity.

The process includes providing an analyzed file of the closed captioning data associated with a video stream (operation 602). In at least one embodiment, the analyzed file is generated by a DVR that lexically analyzes closed captioning data embedded in the video stream. The closed captioning data may be lexically analyzed to generate an analyzed file grouping the closed captioning data into whole words or phrases delineated by white space. During lexical analysis of the closed captioning data, non-displayable portions (e.g., formatting commands) may be replaced with null operations.

In some embodiments, the analyzed file may be received from a content provider of the video stream.

The process further includes outputting the video stream for presentation on a presentation device at a non-real time presentation rate (operation 604). The non-real time presentation rate may be greater than a real time presentation rate of the video stream. In other words, the non-real time presentation rate may be at a rate greater than 1× (e.g., 3×).

The process further includes outputting the closed captioning data from the analyzed file, for presentation by the presentation device in association with the video stream, at the non-real time presentation rate (operation 606). In at least one embodiment, the closed captioning data from the analyzed file is outputted for presentation verbatim. The analyzed file may include all of the closed captioning data for the video stream, all of the displayable portions of the closed captioning data for the video stream, or some selected portion of the video stream for a selected trick play mode presentation rate.

If the non-real time presentation rate becomes too fast to present an entirety of the text data from the analyzed file, then a subset of the text data may be presented instead. Responsive to determining that the non-real time presentation rate is too fast, operation 606 may optionally include selecting a subset of the text data from the analyzed file to present in association with the video stream at the non-real time presentation rate. For example, a subset of words in the closed captioning data from the analyzed file may be selected for presentation. The subset of closed captioning data is then outputted for presentation in association with the video stream.

In at least one embodiment, a DVR may store multiple analyzed files of closed captioning data, each analyzed file designated for presentation at a selected trick play mode presentation rate. For example, a DVR may store analyzed files for a 2× presentation rate, a 5× presentation rate and a 10× presentation rate. Each analyzed file may be optimized to summarize the content of the video stream while maintaining a correlation between the closed captioning data and the frames of the video stream presented by the presentation device.

For example, if a user records a news broadcast, then the closed captioning data for a video stream may include the following dialogue:

Bob>Next we turn to Joe with the weather.
Joe>It's currently 65 degrees outside and slightly overcast. However, we expect a cold front to be moving in this week.
Bob>How cold will it get?
Joe>Good question Bob. Let's turn to our five day forecast to see how cold it's going to get this week.
Tuesday will have a high of 55 degrees with a 10% chance of rain. Expect temperatures of 40 degrees at sunrise.
Wednesday will have a high of 30 degrees with a 50% chance of snow. The temperature will be about 25 degrees at sunrise.
Similar weather on Thursday, with a high of 33 degrees and continued snow. Expect about 4 inches of accumulation on Thursday.
Friday will warm up a little to 37 degrees with scattered snow flurries. The cold front will be moving away by Saturday, with a high of 45 degrees and the snow beginning to melt away.
That's your five day forecast. Be sure to pull out those gloves and hats for this storm.
Bob>Thanks Joe. Stay tuned for sports after our commercial break.

At 1× or 2× playback, the presentation rate of the video stream is relatively slow, so the user may see the entirety of the closed captioning data. At higher presentation rates, the video stream may move too fast to present an entirety of the closed captioning data and a subset of closed captioning data may instead be displayed by the presentation device. For example, at a presentation rate of 5×, the following subset of closed captioning data may be displayed in association with the video stream.

Joe>It's currently 65 degrees outside and slightly overcast. However, we expect a cold front to be moving in this week.
Joe>Lets turn to our five day forecast to see how cold it's going to get this week.
Tuesday will have a high of 55 degrees with a 10% chance of rain.
Wednesday will have a high of 30 degrees with a 50% chance of snow.
Similar weather on Thursday, with a high of 33 degrees and continued snow.
Friday will warm up a little to 37 degrees with scattered snow flurries. The cold front will be moving away by Saturday, with a high of 45 degrees.

The subset of closed captioning data presented may summarize the content as the user fast forwards through the video stream. Thus, a user may determine the subject matter of particular portions of the video stream to decide whether-the watch the selected portion of the video stream or to decide when to stop fast forwarding. At a faster presentation rate of 10×, a subset of closed captioning data that is smaller than the subset for the 5× rate may be presented to the user. For example, the following closed captioning data my be displayed at a 10× presentation rate.

Joe>Cold front this week.
Tuesday 55 degrees.
Wednesday 30 degrees with a 50% chance of snow.
Thursday 33 degrees.
Friday 37 degrees and Saturday 45 degrees.

As illustrated above, selected words of the closed captioning data may be selected to summarize the subject matter of the video stream. Modifications may be made to the closed captioning data to present the summary in an intelligible form. In at least one embodiment, natural language processing may be employed to determine the relevant subject matter of the closed captioning data. Based on determinations generated by the natural language processing, a subset of words of the closed captioning data may be selected to summarize the closed captioning data. The selection process may be performed by the DVR using lexical and semantical analysis of the original closed captioning data. The semantic rules applied to the closed captioning data may be supplied by a content provider and/or a viewer. The selected subset of words is then output by the DVR for presentation during trick mode playback of the content.

In other embodiments, an operator of a service provider may perform the selection process manually to provide a summary of the video stream, and the subset of closed captioning data prepared by the operator may be delivered to the DVR for utilization. The analyzed file prepared by the operator may be designated for presentation in association with the video stream at a selected non-real time presentation rate of the video stream. Thus, an operator may prepare multiple analyzed files for different selected presentation rates.

If a user switches between multiple trick play mode presentation rates, then multiple analyzed files of closed captioning data may be used, one for each of the different trick play mode presentation rates. For example, a first non-real time presentation rate of the video stream may utilize a first analyzed file of closed captioning data, and a second non-real time presentation rate of the video stream may utilize a second analyzed file of closed captioning data. Thus, if a user switches from the first non-real time presentation rate of a video stream to the second non-real time presentation rate, then the second analyzed file may be identified and used to present closed captioning data at the second non-real time presentation rate. For example, if the user is initially fast forwarding at a 2× presentation rate, then the first analyzed file of closed captioning data (designated for a 2× presentation rate) may be utilized for presenting closed captioning data. When the user provides input increasing the presentation rate of the video stream, a DVR may automatically begin using the second analyzed file to present the closed captioning data from the second analyzed file at the second presentation rate.

In some situations, it may be desirable for a user to view the closed captioning data on screen during fast forwarding of a video stream without seeing the video content. For example, a user may desire to see the closed captioning data of the video stream displayed larger in order to more easily scan the closed captioning data to determine a desired resumption point in the video stream. By excluding the video content from presentation, the user is more easily able to focus on reading the closed captioning data.

Figure 7:
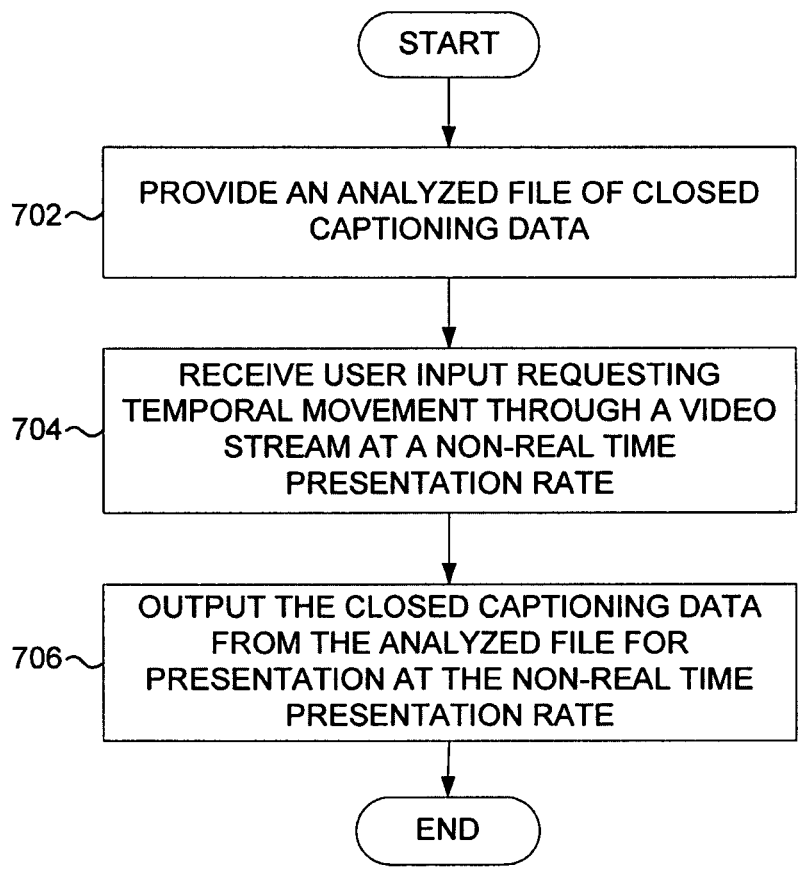
FIG. 7 illustrates another embodiment of a process for presenting text data during trick play mode of a video stream.

FIG. 7 illustrates another embodiment of a process for presenting text data during trick play mode of a video stream. More particularly, FIG. 7 illustrates a process for displaying closed captioning in full screen mode without display of the accompanying video content. The operations of the process of FIG. 7 are not all-inclusive, and may comprise other operations not illustrated for the sake of brevity.

The process includes providing an analyzed file of closed captioning data associated with the video stream (operation 702). Operation 702 may be performed as described above in operation 602 of FIG. 6.

The process further includes receiving user input, requesting temporal movement through the video stream, at a non-real time presentation rate different than a real time presentation rate of the video stream (operation 704). For example, the user input may request fast forwarding through the video stream at a non-real time presentation rate greater than the real time presentation rate of the video stream. In other embodiments, the user input may request slow motion presentation (e.g., 0.5×) of the video stream. The user input may be provided by any type of user input device, such as a remote control or buttons on a front panel of a DVR.

The process further includes outputting the text data from the analyzed files for presentation by a presentation device in place of the video stream during the temporal movement through the video stream, at the non-real time presentation rate (operation 706). In other words, the presentation device may present the closed captioning data on the screen without the video content of the video stream. As the user continues to temporally move through the video stream, the associated closed captioning data, or a selected subset thereof, is retrieved from the analyzed file and displayed by the presentation device. When the user desires to initiate playback of the video stream at the real time presentation rate, then the video frames of the video stream are outputted for presentation by the presentation device. Thus, the user may read the closed captioning data to determine the relevant subject matter of portions of the video stream and may resume playback at a desired point in the video stream.

Although specific embodiments were described herein, the scope of the invention is not limited to those specific embodiments. The scope of the invention is defined by the following claims and any equivalents therein.

What is claimed:

1. A method for presenting text data during trick play mode of video streams, the method comprising:
   querying a content provider of a video stream of video frames having original closed captioning data embedded therein for a plurality of analyzed text data files, wherein the querying is in response to a request from a user to view the video stream;
   receiving the plurality of analyzed text data files from the content provider in association with receiving the video stream from the content provider;
   providing the plurality of analyzed text data files associated with the video stream, wherein the analyzed text data files are provided in addition to the original closed captioning data of the video stream to accommodate display of text from the analyzed text data files independently of the video frames, wherein each of the analyzed text data files is generated from the original closed captioning data, and wherein each of the analyzed text data files is designated for presentation at a different non-real time presentation rate that is greater than a real time presentation rate of the video stream;
   outputting the video stream for presentation on a presentation device at a designated one of the different non-real time presentation rates; and
   outputting the analyzed text data from a designated one of the analyzed text data files that corresponds to the designated one of the different non-real time presentation rates, for presentation by the presentation device in association with the video stream in place of the original closed captioning data, at the designated one of the different non-real time presentation rates, wherein the outputted analyzed text data is a subset of the original closed captioning data that summarizes the original closed captioning data in a semantically intelligible form;
   wherein, for the plurality of analyzed text data files, smaller subsets of the original closed captioning data are associated with higher non-real time presentation rates of the outputted video stream, and larger subsets of the original closed captioning data are associated with lower non-real time presentation rates of the outputted video stream.

2. The method of claim 1, wherein providing the plurality of analyzed text data files further comprises:
   lexically analyzing the original closed captioning data embedded in the video stream to generate the analyzed text data files.

3. The method of claim 2, wherein lexically analyzing the closed captioning data further comprises:
   replacing non-displayable portions of the original closed captioning data with null operations.

4. A method for presenting text data during trick play mode of a video stream, the method comprising:
   querying a content provider of a video stream for a plurality of analyzed text data files, wherein the querying is responsive to a request from a user to view the video stream, and wherein the video stream comprises video frames having original closed captioning data embedded therein;
   receiving the plurality of analyzed text data files from the content provider in association with receiving the video stream from the content provider, each of the plurality of analyzed text data files being designated for presentation in association with the video stream at a selected one of a plurality of different non-real time presentation rates of the video stream, wherein the analyzed text data files are received in addition to the original closed captioning data of the video stream to accommodate display of text from the analyzed text data files independently of the video frames, each of the analyzed text data files including a different subset of the original closed captioning data that is presented with the video stream at a real time presentation rate of the video stream;

outputting the video stream for presentation on a presentation device at a designated one of the different non-real time presentation rates; and outputting the text data from the a designated one of the analyzed text data files that corresponds to the designated one of the different non-real time presentation rates, for presentation by the presentation device in association with the video stream in place of the original closed captioning data, at the designated one of the non-real time presentation rates, wherein the outputted text data summarizes the original closed captioning data in a semantically intelligible form;

wherein, for the plurality of analyzed text data files, smaller subsets of the original closed captioning data are associated with higher non-real time presentation rates of the outputted video stream, and larger subsets of the original closed captioning data are associated with lower non-real time presentation rates of the outputted video stream.

5. The method of claim 4, wherein each of the analyzed text data files includes a subset of words of the original closed captioning data delineated by white space.

6. A method for presenting text data during trick play mode of video streams, the method comprising:

receiving a request from a user to view a video stream of video frames having original closed captioning data embedded therein;

querying a content provider of the video stream for a plurality of analyzed text data files, wherein the querying is responsive to receiving the request, and wherein the plurality of analyzed text data files are associated with the video stream;

receiving the plurality of analyzed text data files, wherein the analyzed text data files are received in response to the querying and are provided in addition to the original closed captioning data of the video stream to accommodate display of text from the analyzed text data files independently of the video frames, wherein each of the analyzed text data files is generated from the original closed captioning data, and wherein each of the analyzed text data files is designated for presentation at a different non-real time presentation rate that is greater than a real time presentation rate of the video stream;

receiving user input, requesting temporal movement through the video stream, at a designated one of the different non-real time presentation rates; and outputting the text data from a designated one of the analyzed text data files that corresponds to the designated one of the different non-real time presentation rates, for presentation by a presentation device in place of the video stream and in place of the original closed captioning data, during the temporal movement through the video stream, at the designated non-real time presentation rate, wherein the outputted text data summarizes the original closed captioning data in a semantically intelligible form;

wherein, for the plurality of analyzed text data files, smaller subsets of the original closed captioning data are associated with higher non-real time presentation rates of the outputted video stream, and larger subsets of the original closed captioning data are associated with lower non-real time presentation rates of the outputted video stream.

7. The method of claim 6, further comprising:

lexically analyzing the original closed captioning data embedded in the video stream to generate the plurality of analyzed text data files.

8. A digital video recorder comprising:

a receiver that receives a video stream from a content provider, the video stream comprising video frames having original closed captioning data embedded therein, wherein the receiver also receives a plurality of analyzed text data files from the content provider in association with receiving the video stream;

a storage medium communicatively coupled to the receiver that stores the video stream for subsequent playback, and that stores the plurality of analyzed text data files, wherein the analyzed text data files are separate from the video stream to accommodate display of text from the analyzed text data files independently of the video frames, wherein each of the analyzed text data files is generated from the original closed captioning data, and wherein each of the analyzed text data files is designated for presentation at a different non-real time presentation rate that is greater than a real time presentation rate of the video stream;

a processor module communicatively coupled to the storage medium that:

outputs the video stream for presentation on a presentation device at a designated one of the different non-real time presentation rates; and outputs the text data from a designated one of the analyzed text data files that corresponds to the designated non-real time presentation rate, for presentation by the presentation device in association with the video stream and in place of the original closed captioning data, at the designated non-real time presentation rate, wherein the outputted text data summarizes the original closed captioning data in a semantically intelligible form;

wherein, for the plurality of analyzed text data files, smaller subsets of the original closed captioning data are associated with higher non-real time presentation rates of the outputted video stream, and larger subsets of the original closed captioning data are associated with lower non-real time presentation rates of the outputted video stream; and wherein the processor module queries the content provider for the analyzed text data files responsive to receiving a request from a user to view the video stream.

9. The digital video recorder of claim 8, wherein the processor module:

lexically analyzes the closed captioning data embedded in the video stream to generate the analyzed text data files; and stores the analyzed text data files on the storage medium.

10. The digital video recorder of claim 8, wherein the processor replaces in the analyzed text data files non-displayable portions of the original closed captioning data with null operations.

11. A digital video recorder comprising:

a receiver that receives a video stream from a content provider, the video stream comprising video frames having original closed captioning data embedded therein, and that receives a plurality of analyzed text data files from the content provider in association with receiving the video stream, each being designated for presentation in association with the video stream at a selected one of a plurality of different non-real time presentation rates of the video stream, wherein the analyzed text data files are separate from the video stream to accommodate display of text from the analyzed text data files independently of the video frames, and wherein each of the analyzed text data files includes a different subset of the original closed captioning data for presentation in association with the video stream at a designated one of the real time presentation rates of the video stream;

a storage medium communicatively coupled to the receiver that stores the video stream and the analyzed text data files for subsequent playback; and a processor module communicatively coupled to the storage medium that:

outputs the video stream for presentation on a presentation device at the designated non-real time presentation rate; and outputs the text data from a designated one of the analyzed text data files that corresponds to the designated non-real time presentation rate, for presentation by the presentation device in association with the video stream and in place of the original closed captioning data, at the designated non-real time presentation rate, wherein the outputted text data summarizes the original closed captioning data in a semantically intelligible form;

wherein, for the plurality of analyzed text data files, smaller subsets of the original closed captioning data are associated with higher non-real time presentation rates of the outputted video stream, and larger subsets of the original closed captioning data are associated with lower non-real time presentation rates of the outputted video stream; and wherein the processor module queries the content provider for the analyzed text data files responsive to receiving a request from a user to view the video stream.

\* \* \* \* \*